(12) United States Patent
Rabibadhana (10) Patent No.: US 11,080,647 B2
(45) Date of Patent: Aug. 3, 2021

(54) COMPUTER VISION AND DIGITAL IMAGE SCANNING BASED INVENTORY MANAGEMENT SYSTEM

(71) Applicant: Pakornvich Rabibadhana, Irvine, CA (US)

(72) Inventor: Pakornvich Rabibadhana, Irvine, CA (US)

( * ) Notice: Subject to any disclaimer, the term of this patent is extended or adjusted under 35 U.S.C. 154(b) by 589 days.

(21) Appl. No.: 15/617,030

(22) Filed: Jun. 8, 2017

(65) Prior Publication Data

US 2018/0357594 A1    Dec. 13, 2018

(51) Int. Cl.
*G06Q 10/08*     (2012.01)
*G06F 16/14*     (2019.01)

(52) U.S. Cl.
CPC ......... *G06Q 10/087* (2013.01); *G06F 16/156* (2019.01)

(58) Field of Classification Search
None
See application file for complete search history.

(56) References Cited

U.S. PATENT DOCUMENTS

| | | | |
|---|---|---|---|
| 7,245,221 B2 | 7/2007 | Claudatos | |
| 7,941,330 B1 * | 5/2011 | Buentello | G06Q 40/02 705/4 |
| 7,946,492 B2 | 5/2011 | Rohs | |
| 8,296,259 B1 | 10/2012 | Trandal | |
| 8,438,084 B1 * | 5/2013 | Tesler | G06Q 10/087 705/29 |
| 10,049,236 B1 * | 8/2018 | Alkarmi | G06Q 10/08 |
| 2008/0041947 A1 * | 2/2008 | Hollister | G06Q 10/08 235/385 |
| 2012/0037700 A1 | 2/2012 | Walji | |
| 2014/0009612 A1 * | 1/2014 | King | G06K 19/06028 348/143 |
| 2014/0267776 A1 * | 9/2014 | Duthu | G01S 17/89 348/169 |
| 2015/0060319 A1 * | 3/2015 | Perry | G09F 3/208 206/459.5 |

(Continued)

FOREIGN PATENT DOCUMENTS

WO    WO-2016193253 A1 * 12/2016    ............ G06Q 10/06

*Primary Examiner* — Scott A Zare (57) ABSTRACT

Present invention discloses a system and method that allow users to manage and keep track of the inventory items stored inside a closed container through computer vision, digital imaging processing and recognition and scanning means wherein the user can catalogue items to be stored and later able to locate the items stored inside a container anytime, anywhere without having to open the container or come to the storage location. The system uses the camera of the user mobile device to function towards its working process. Specifically, this invention integrates digital images taken from the user's mobile device with that of an improved computer vision scanning means that can readily scan any handwritten mark or label drawn or affixed on the exterior of the box to display the details of the items stored inside it. Disclosed invention is configured to run on any handheld devices such as smart phones and routed to the mobile application for display to a user. The system further enables user to find inventories, update the items, adding up and share the information to other users which allows the inventory process to be easily managed at a very low cost for larger user population.

12 Claims, 5 Drawing Sheets

(56) References Cited

U.S. PATENT DOCUMENTS

| | | | |
|---|---|---|---|
| 2015/0254603 A1* | 9/2015 | Bashkin | A47B 57/06 312/237 |
| 2018/0225949 A1* | 8/2018 | Mowatt | G08B 21/24 |

* cited by examiner

COMPUTER VISION AND DIGITAL IMAGE SCANNING BASED INVENTORY MANAGEMENT SYSTEM

TECHNICAL FIELD

The invention relates to the field of computer vision and digital image recognition and processing for advancement of inventory management. In particular, the invention relates to an interactive system and method of cataloguing inventory items.

BACKGROUND OF THE INVENTION

Tracking inventory in a manner like "what is where kept" is a tedious process in itself, be it for household or industries. The task of manual sorting, cataloguing and keeping record of the inventory items is an arduous and time consuming process. But the benefits of keeping a good inventory record can prove a huge worthwhile during contents restoration or for good housekeeping. It streamlines the process and makes it easier to find necessary items of need. An inventory in the context of a home can be used to maintain an itemized list of objects in one's possession. An inventory in the context of a business can be used to maintain a record of the goods and materials in stock. Conventionally, a manual listing of items were being prepared wherein each such items were manually listed in a paper. Needless to stress the detriment it was causing at least when the categories of items were different or the cataloguing was made in relationship to more than one given location or types of inventory including the times when any of the listed items were to be removed or replaced or a new listing were to be prepared.

Later developments in this field saw manifold emergence of digitized management of inventories. Emergence of computerized inventory tracking systems made it possible to integrate the various functional subsystems that are a part of the inventory management into a single cohesive system. Such systems are capable of addressing a wide variety of record keeping needs including inventory management in one integrated system.

Recent Automation of inventory control has influenced all phases of inventory management, including counting and monitoring of inventory items; recording and retrieval of item storage location; updating changes to inventory; and anticipating inventory needs, including inventory handling requirements. Nowadays computer systems are linked into networks to be able to receive information from handheld devices. They are wireless handheld devices that can scan bar codes on inventory items and send data to a tracking database in real time. The use of scanning devices are being employed for scanning barcodes or other labels affixed on a particular item. It is the barcode that identifies and generates the item details. However, the barcode only generates the data in text format. In the field of inventory management, implementation of scanning system are made to scan barcodes affixed against a storage container in order to generate data of the storage container and exporting the same to personal computer or handheld devices. This practice is generally followed in big industrial warehouses where bulky items are managed.

The use of barcode scanner generally requires a lot of investment upfront which is not affordable or is not practical for users managing inventory on smaller scale like managing household inventories, self-storage keeping users, or smaller businesses where the volume of goods are generally low and notably these users belongs to a larger part of the population.

For smaller scales, inventory management methods are mostly done manually which is cumbersome as it requires reopening of the container or boxes, writing down on paper or entering information into a computing device. It is time and energy consuming. In general people seal the boxes/storage containers after storing items in it, later they tend to forget which item was in which box/container. Many of them may not even record inventory. So, to find which box has the items they need, they have to reopen and go through many boxes which again consume time and effort.

Therefore, there exist a need in this field to have a system of managing household, self-storage, smaller businesses inventories via user friendly technology not requiring use of expensive devices, pre coded scanning devices and computers to record, update and manage inventories.

Many inventions have been made in this regard. While some incorporates the usage of images for direct recording and storing the accessed details in a computer readable medium (US 20060282342), some include the use of barcode or QR codes to scan the details of inventory. However, every such invention requires the user to create a bar code or QR code, print them out, embed on box or items and upload the item details to a network to link with those created barcodes or QR codes (US 20150102098). Inventors have taken recourse to such printed codes for tracking of the inventory without which the tracking and viewing is not possible. However, the result of inclusions of both digital imaging and bar code/QR code scanners, as discussed earlier is not convenient since it consumes much time, effort and costs a huge sum for users, as a consequence, such systems are not favoured by the masses.

In the light of the discussed drawbacks, there is a standing need for a system of inventory management that employs very minimal costs for the large audience who need to manage lower scale inventory. A storage management system that would allow users to record and organize inventory using image recognition and computer vision method without any embedded code or pre-printed identifiers, enabling users to search and find which contents are in which container anywhere, anytime, without having to open the containers or even come to the storage location. It is the object of the present invention to provide all these features in a single inventory management system in a cost effective manner which is easy and convenient to use so that it remains accessible to a large mass of population, especially those handing small scale inventories.

SUMMARY OF THE INVENTION

Present invention is a software based system and method that allow users to manage and keep track of the inventory stored inside closed containers using computer vision, digital imaging recognition and scanning means in a manner that the user can map the items (hereinafter may be termed as "Content" or "contents", both the terms "item(s)" and "content(s)" shall be construed to have the same meaning) to an image of a mark drawn or affixed at the exterior of the container which shall represent the container that the contents are stored (hereinafter referred to as "Box ID") and allow users to scan the Box ID at the exterior of the container and see the images or video of the contents stored inside the box in the smart phones without having to open the container, or the user can view the contents by tapping the Box ID in the mobile application anytime, anywhere without having to come to the storage. The system also enables user to search, find inventories as well as update the contents and share the information to others which in turn will help to locate the needed contents and manage inventory in a convenient manner. The goal of this invention is basically to provide an alternative way other than implementing barcode or QR Code scanners for inventory management allowing more people to access good inventory management system in the most convenient manner. This invention, in particular incorporates the use of computer vision, digital image processing and improved algorithm process that is able to scan any handwritten mark, print, label drawn or affixed at the exterior of the container to view the contents stored inside the container. This system is configured to run on any handheld devices such as smart phones or tablets and display the results on the mobile devices via the mobile application. The working method of this system is equally beneficial and user friendly.

Present system integrates built-in camera of the mobile device to function towards its working process. Users simply have to take pictures or videos (hereinafter "Images") of the individual or collective content(s) they are intending to store in the container and then take picture of any handwritten mark/label/stickers drawn on the exterior of the box which will act as a Box ID for the entire set of items stored in the box. The system will map the images of the stored contents to the particular Box ID as selected by the user. User can simply with their mobile devices either tap the Box ID they wish to check the items within or scan the Box ID at the exterior of the container to see what items are inside without having to open the container.

Not only for inventory management of physical items or products being stored in closed containers this system can be utilized for, the management of document files, photos or stationeries in workplaces.

It is the objective of the invention to provide a cost effective inventory management system that can readily record the items place inside a container using user device camera.

Another objective of the invention is to provide for a handy inventory management system that can keep track of the inventory contents inside a sealed box using a scanning algorithm mechanism that can be used to scan any handwritten, mark/label on the exterior of the container to view the details of the contents stored inside without having to open the container.

Yet, another objective of the invention is to provide for a time saving inventory management system that can help users in recoding, keeping track of their inventory, and able to search and find the items in an advanced folder like manner where in just a few taps on their device, users can view and locate what content(s) are where kept.

How the foregoing objects are achieved will be clear from the following description. In this context it is clarified that the description provided is non-limiting and is only by way of explanation.

DETAILED DESCRIPTION OF THE INVENTION

In the following paragraphs, a brief and non-limiting description of the preferred embodiment is disclosed.

All through the specification, the technical terms and abbreviations are to be interpreted in the broadest sense of the respective terms, and include all similar items in the field known by other terms, as may be clear to persons skilled in art. Restriction or limitation if any referred to in the specification, is solely by way of example and understanding the present invention.

Exemplary embodiments of the disclosure as described herein generally include systems and methods for managing inventory using mobile devices. Accordingly, while embodiments of the disclosure are susceptible to various modifications and alternative forms, specific embodiments thereof are shown by way of example in the drawings and will herein be described in detail. It should be understood, however, that there is no intent to limit embodiments of the disclosure to the particular exemplary embodiments disclosed, but on the contrary, embodiments of the disclosure cover all modifications, equivalents, and alternatives falling within the spirit and scope of the disclosure.

The present invention seeks to address the drawbacks associated with the existing inventory management system. To achieve this purpose, the present invention discloses a system that assist in organizing and locating inventory that are stored in a container or any distance storage container. The invention discloses features that allows users to effectively compile their inventory and locate the items inside a container without having to open the container or going to the distant storage locations.

Present invention in one of its preferred embodiments attains the objective by combining computer vision method and digital imaging recognition process with scanning means through software algorithm configured in the mobile application utilizing the built-in mobile device camera. In the front end user typically have signing-in page or section, where the user enters his/her required credentials to get access to a user account.

The key process for this system works by taking individual or combined pictures or videos of the items to be stored in a particular box or container. User next takes the picture of any mark on the exterior of the box which will act as a Box ID representing the items stored inside the particular Box. For viewing the items stored inside, user on their mobile devices can simply tap a particular Box ID which is a picture of a mark identifying the set of items user stored in the box. A BOX ID can be a picture of a handwriting on the exterior of the box such as a writing says "Kitchen Items", "James' Books", "Bedroom 1", "Miscellaneous", etc. or it can be a sticker, printed label, etc. User can also scan the Box ID at the exterior of the box, which in turn will display the item details stored within that particular box. Besides, user can also input keywords to search for the items user is looking for according to the tags or descriptions user had entered when taking pictures or videos of the contents, the mobile application will return the results. The item details are shown in manner of visual representation which without limitation includes individual or combined image(s), video(s) of items, description, location details, category or any other specific fields related to the items. The Box ID as referred herein is designed to represent a particular box/container in manner of a folder. For instance, it's the same as when documents or image files are stored in a folder while working on a computing device. The Box ID as described herein may be in the form of an image of the handwriting, mark, label or other mark as may be specified. In a box there could be stored as many as different categories of items user stores in. However, one Box ID will represent one particular box.

The steps included in the process and their working methods are described as follows. However, it is to be noted that the working process is designed for conveniently stating and illustrating purposes, thus while actual functioning the working process as stated not necessary be in order of the steps below. For example, users can start with step 2 and will be directed to complete step 1 afterwards, etc.:

Step 1: Creating of Box ID

Figure 1:
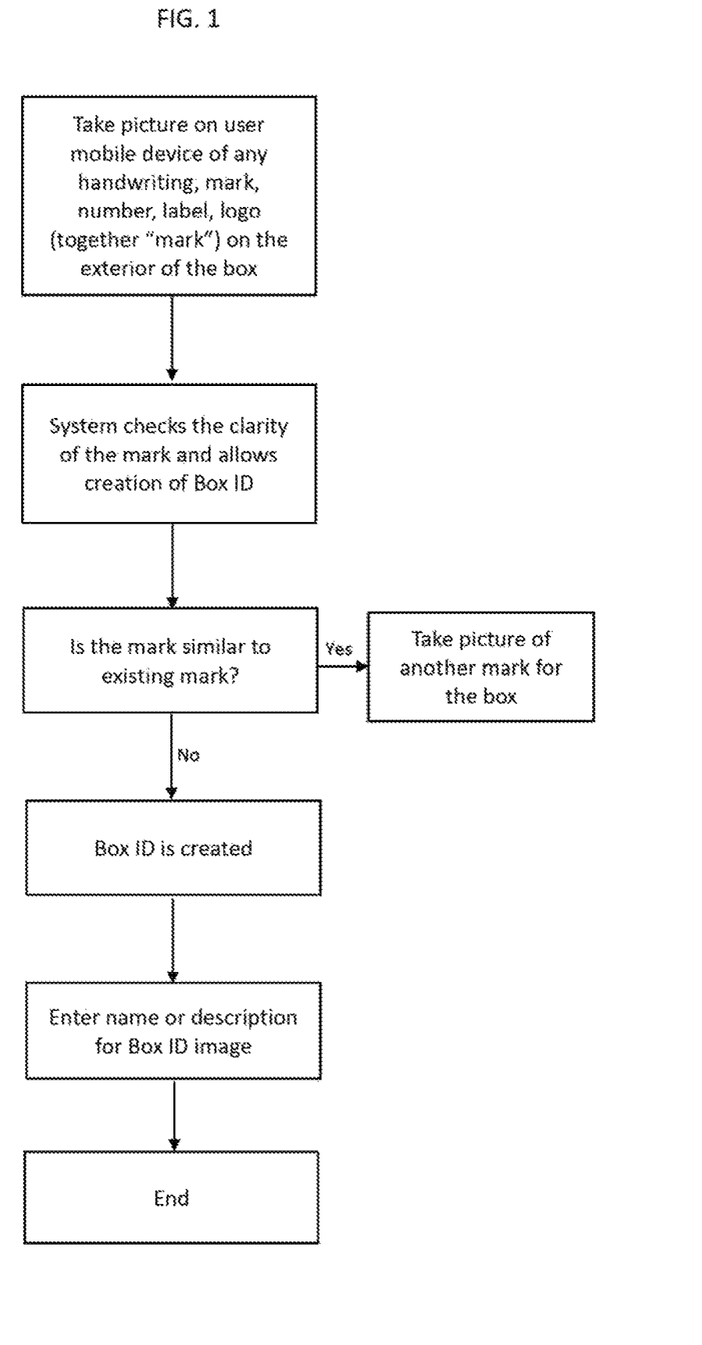
FIG. 1 is a flow chart explaining the step of creating a Box ID.

FIG. 1 is an overview of the method and system comprising of the present invention. As mentioned in the earlier paragraphs, one Box ID will represent one box of contents, the invention provides for two way approach of creating a Box ID. One is where the step will begin with taking pictures of individual or collective contents (as detailed in step 2 for cataloguing inventory contents) and the other where a Box ID is created at first place. At this instance, the latter approach of creating the Box ID at first place is explained. A Box ID is created by using a camera on user's mobile device to take picture of any mark, number, label, logo, including handwritten or pre-existing ones (hereinafter "mark") on the exterior of the box. Upon taking pictures of the mark, the system proceed to examine the quality of the Box ID image, similarity of the new Box ID with the existing Box IDs and on confirming the quality of Box ID and non-identicalness with existing Box IDs, the system allows creation of new Box ID by reverting ratings against it. On the contrary, user retakes another picture for the Box ID. Once a Box ID is created, user then enters a name or description for the Box ID.

Step 2: Recording and Storing Inventory Contents with the Box ID

Figure 2:
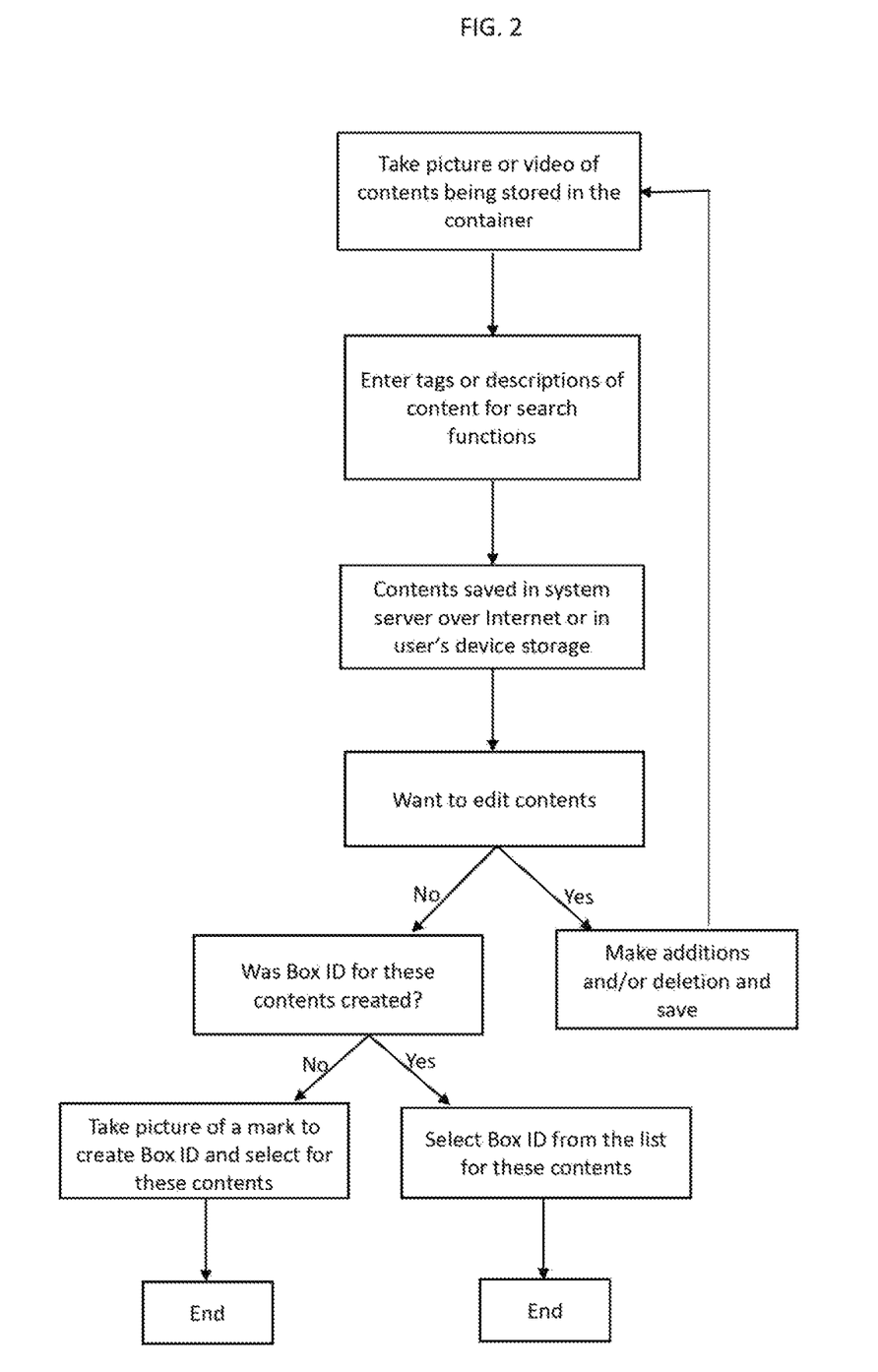
FIG. 2 is a flow chart showing the step of Recording, storing contents with the Box ID.

FIG. 2 shows the method of recording and storing inventory contents with the Box ID created at previous step. User are required to take individual or collective images or videos of the inventory contents to be stored. The contents either individually or collectively will be given a tag name or description (hereinafter "Content ID") so as to enable search function for the contents. The list of the contents to be stored is saved in the system database via Internet or the device storage memory under the particular Content ID. User can later make additions or deletion to by tapping an option enabled for the same which will take the screen back to the record contents page. The user thereby can make additions or deletion of the contents as per his choice and proceed further by tapping Next option appearing on the screen. User then selects or confirms which Box ID the recorded inventory contents belong to and save the same by taping an option provided for it. If the user at this step wishes to move certain contents to or from the container the user has not created a Box ID for, he can create a new Box ID and proceed next.

Step 3: Mapping Box ID with Saved Contents

Figure 3:
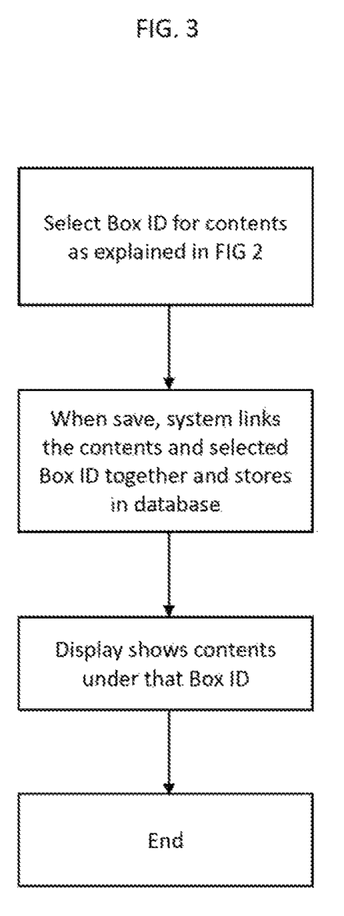
FIG. 3 is a schematic diagram illustrating the step of mapping Box ID with the stored inventory contents.

FIG. 3 shows the method of mapping Box ID with the saved inventory contents to enable user to track the saved contents proposed in the present invention. This method is handled in the background by the system. User will not see the action. User only performs the selections of contents and Box ID as mentioned in FIG. 2. By selecting a particular Box ID for the contents as explained in the previous step, the contents will be saved and linked with the particular Box ID. The display screen of the mobile device displays the Box ID selected against the contents. The system will link the recorded contents to the Box ID in accordance to the selection made by the user. This process is called "Mapping". The system maps the Box ID and the contents saved within it together in a database in a manner to display the correct box for the particular stored contents in it. During this process of mapping, user can put tags on Box ID and on each contents so as to search easily through the system.

Step 4: Tracking and Viewing of Inventory Contents Through the System

Figure 4A:
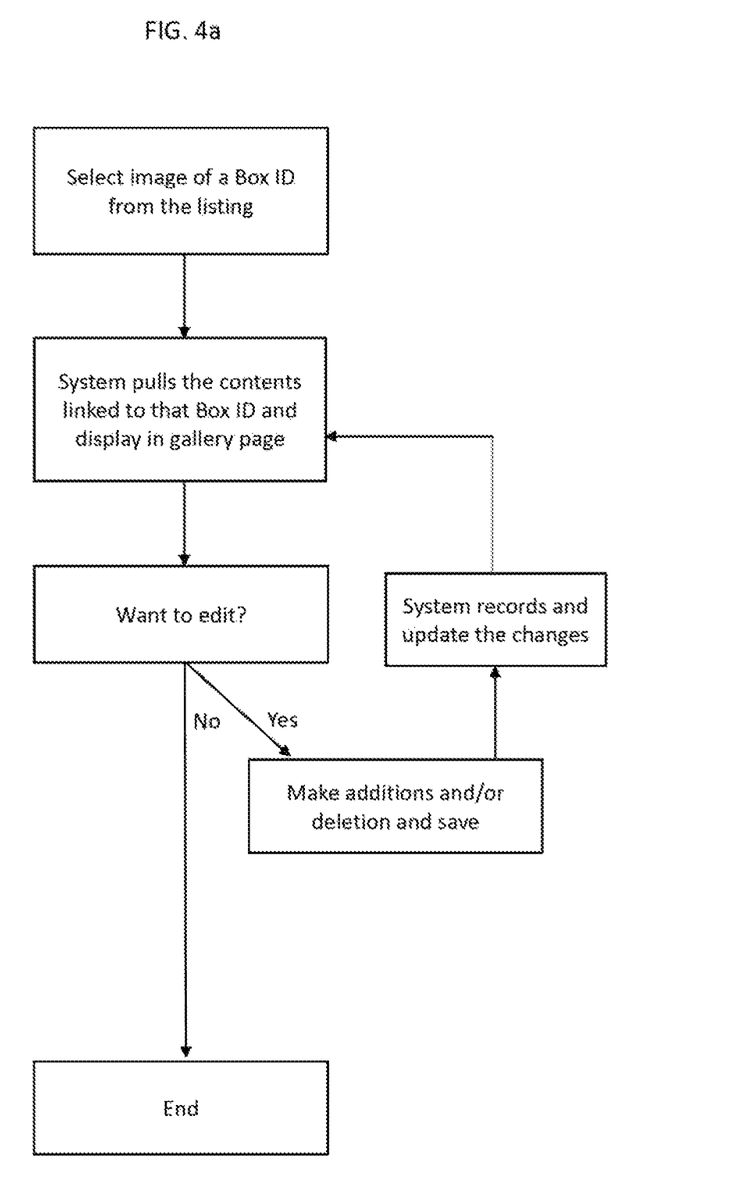
FIG. 4a is a schematic diagram explaining the step of tracking and viewing inventory contents as embodied in the present invention.

FIG. 4a shows the method of tracking inventory contents remotely as proposed in the present invention. User can tap the thumbnail of the required Box ID in the mobile application from the list of existing Box IDs created under the user ID and can readily view the images of the contents stored within that Box ID.

Figure 4B:
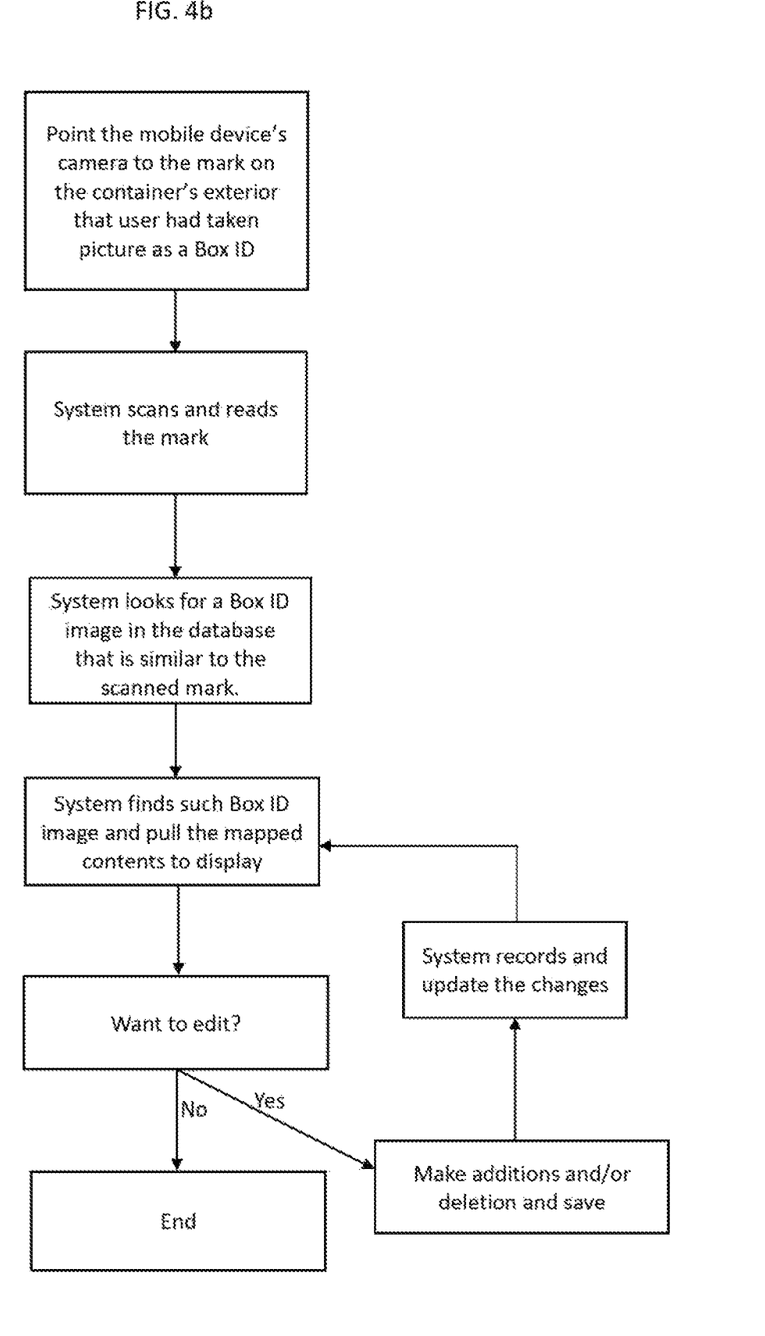
FIG. 4b is a schematic diagram explaining an alternative method of tracking and viewing inventory contents by scanning Box ID mark on the container as embodied in the present invention.

FIG. 4b shows an alternative method of performing tracking and viewing of inventory contents. The user may choose to instead scan the Box ID mark directly from the box using the camera of the mobile device. The system's scanning methods operated on the mobile application will use image recognition and computer vision methods with software algorithm codes to scan and read the target image details pattern and search for the same that is stored in database as Box ID image user had created. The system then opens a page to display the contents that were mapped to that Box ID for user to view details on his mobile device.

This system thus enables user to track or view stored items inside the box without having to open the box. When retrieving the contents to display, user may also edit the contents by either adding or removing contents to the box. The system will accordingly update the database and save the contents as updated by the user.

In one embodiment of this invention, the user in the view contents page, can manage and update his inventory contents by making additions or deletion of the stores contents.

In another embodiment of the present invention, the working process of the invention as defined herein can function online and offline on the user device. Further, the images taken for working of the invention may be stored in user's device hardware, or on the system server through internet facilitating lower consumption of space in user's hardware device. This feature is also beneficial to divert the storage of images when the user has more to record or save than what his device storage space capacity.

Yet in a further embodiment of the present invention, user can add other users to his account for sharing information related to inventories or to record activities of addition or deletion of inventories by other users (when the items are remotely stored at distance place or at warehouse). The user further may send links to other users for allowing them to assist in managing or locating the item details the former user stored in the boxes. For working of this process, when the user adds other users to the account or send links to view contents, a communication tool is configured in the system through which the user would send textual or voice instruction to the other users for managing the stored inventories. In detailed perspective, a report section will function in hand with the communication tool. The report section will display the activity logs of the user or the other users the former adds to his account.

In other words, the system will record the activities and updates user has done to manage inventories, Record date and time of when and what kind of activities is done under his account. For example, which box or items the user views and when, which box the user has deleted some items from, adding items to a box, date and time of such log, etc.

Record who does what activities at which date and time, etc., when a user adds other users to his account to share information.

In an alternative embodiment, present invention can be exploited for other purposes. Since predominant feature of this invention lies in the image recognition where the system scans an image and the process of locating contents follows. Thus, with this method any other type of items or related files can be pulled up. For instance, this system can record documents by pages, such as contracts, manuals, or even picture collections, etc., and then can store the recorded documents under a Box ID in the manner disclosed above. Thereupon scanning or tapping the Box ID will redirect the user to see the documents or images he had recorded. Similarly, with the utility of content organization as taught in this invention, management of stacked files or stationary items at workplaces can be easily executed through this system.

The improved combination of inventory organization with a unique computer vision and image recognition feature that integrates scanning of handwritten mark/label to find inventory or content details stored within sets the invention apart from the inventions known in the prior art. More specifically, the configuration of the highlighted features are not only novel for its functionality but also serves the need of managing contents from remote location, allowing access to multiple users, recoding or tracking of each activity logs goes within the user account, all this connected over one server. The simplified process involved in this invention makes it easy for use and cost-efficient for a larger user population.

Although the present specification, the invention has been described in some detail by way of illustration and example for purposes of clarity, it will, of course, be understood that various changes and modifications thereof may be made in the form, details, and arrangements of the parts without departing from the scope of the present invention.

The invention claimed is:

1. A computer method to map and keep track of a plurality of content stored inside a container at a location using a computer vision along with a digital image recognition, the computer method comprising:
   a. allowing a user to input user credentials and sign up on a secured database of a computer system using a mobile device of the user;
   b. creating and maintaining by the computer system a User ID associated with the user credentials inputted by the user;
   c. creating by the computer system a Box ID by taking an image of any of a mark or a label written on, or affixed to an exterior of the container using a camera of the mobile device of the user, wherein the computer system examines a quality of a new Box ID image and compares the new Box ID image with existing Box ID images that the user has previously taken to prevent duplications of Box IDs;
   d. using the camera of the mobile device of the user, recording the plurality of content to be stored in the container by taking photos or videos of the plurality of content and adding an individual or collective tag to the recorded plurality of content;
   e. mapping of the recorded plurality of content with the Box ID by the computer system;
   f. tracking of the recorded plurality of content through the computer system in the mobile device of the user by either:
      using the camera of the mobile device of the user to scan any of the mark or label written on, or affixed to, the exterior of the container and displaying the recorded plurality of content;
      by the user selecting the Box ID; or
      the user entering a description or the individual or collective tag to search for the recorded plurality of content and view the recorded plurality of content of the Box ID;
   g. allowing the mobile device of the user to manage the recorded plurality of content by creating an option for adding, deleting or moving the plurality of content to and from the container and to auto-update saved edits on the secured database for the Box ID; and
   h. sharing an information and a joint activity log with a plurality of users, adding the plurality of users to the User ID, sending User ID related links or information to other users including sending of an instruction to manage or edit the plurality of content;
wherein mapping of the recorded plurality of content with the Box ID comprises the computer system linking said recorded plurality of content to the Box ID and storing the recorded plurality of content and their relationship with the Box ID on the secured database in order to display the recorded plurality of content when the Box ID is retrieved or when a search or browse for the recorded plurality of content has been conducted;
wherein the computer system stores the recorded plurality of content and Box ID images over a system server through an internet facilitating a lower consumption of a space in the mobile device of the user.

2. The method of claim 1, where the tracking of the plurality of recorded content can also be done by selecting a Box ID directly by browsing existing Box IDs on a listing page from an interface of the computer system of the mobile device of the user.

3. The method of claim 1, where the Box ID represents the plurality of content stored inside the container.

4. The method of claim 1, where one Box ID represents one particular container.

5. The method of claim 1, where the recording of the plurality of content includes capturing still images or video pictures of the plurality of content to be stored within the container.

6. The method of claim 1, where the plurality of content are either individually or collectively given a tag name.

7. The method of claim 1, where the mobile device of the user includes an inbuilt digital camera.

8. The method of claim 1, where mapping of the plurality of content with the Box ID includes an option of putting tags for the Box ID or putting tags for contents being mapped to the Box ID.

9. The method of claim 1, where the tags include a name, a description, or a keyword the user had entered while taking recording or saving of the Box ID or the plurality of content.

10. The method of claim 1, where the recording of the plurality of content or tracking of the recorded plurality of contents are carried out via the computer vision, the digital image recognition or via scanning through the computer system.

11. The method of claim 1, where a communication tool is further configured with a report section that records and displays all activity logs carried out by the plurality of users.

12. The method of claim 1, where the method includes an interface of the computer system of the mobile device of the user that allows the user to search, view, edit, manage and locate the plurality of content.

* * * * *